United States Patent
Guyomard

(10) Patent No.: US 6,290,287 B1
(45) Date of Patent: Sep. 18, 2001

(54) STRUCTURAL ELEMENT WITH AT LEAST A HEADLAMP, AND METHOD FOR MOUNTING SUCH AN ASSEMBLY IN A MOTOR VEHICLE BODY

(75) Inventor: Jean-Nicolas Guyomard, Le Mesnil Fuguet (FR)

(73) Assignee: Valeo Vision (FR)

( * ) Notice: Subject to any disclaimer, the term of this patent is extended or adjusted under 35 U.S.C. 154(b) by 0 days.

(21) Appl. No.: 09/555,113
(22) PCT Filed: Sep. 24, 1999
(86) PCT No.: PCT/FR99/02281
   § 371 Date: May 24, 2000
   § 102(e) Date: May 24, 2000
(87) PCT Pub. No.: WO00/17007
   PCT Pub. Date: Mar. 30, 2000

(30) Foreign Application Priority Data

Sep. 24, 1998  (FR) .................................................. 98 11931

(51) Int. Cl.$^7$ .................................................. B60R 27/00
(52) U.S. Cl. ........................... 296/194; 296/193; 362/549
(58) Field of Search .................................... 296/193, 194, 296/196, 197, 203.01, 203.02; 362/496, 546, 549

(56) References Cited

U.S. PATENT DOCUMENTS

| | | | |
|---|---|---|---|
| 3,295,627 | * 1/1967 | Fleck et al. ...................... | 296/194 X |
| 4,196,459 | * 4/1980 | Dick ................................. | 362/549 |
| 4,380,099 | * 4/1983 | Dick et al. ....................... | 403/329 |
| 4,466,646 |   8/1984 | Delmastro et al. .............. | 293/117 |
| 4,532,578 | * 7/1985 | Gaden et al. .................... | 362/549 |
| 4,794,495 | * 12/1988 | McMahan et al. ............. | 362/549 X |
| 4,849,861 | * 7/1989 | Arima .............................. | 362/496 X |
| 5,010,456 | * 4/1991 | Reichman et al. .............. | 362/549 |
| 5,113,331 | * 5/1992 | Nagengast ....................... | 362/546 |
| 5,180,219 | * 1/1993 | Geddie ............................. | 362/546 |
| 5,268,825 | * 12/1993 | Blancheton .................... | 362/496 |
| 5,285,357 | * 2/1994 | Makita ............................. | 362/549 |
| 5,584,570 | * 12/1996 | Binder et al. .................... | 362/496 X |

FOREIGN PATENT DOCUMENTS

| | | | |
|---|---|---|---|
| 0 026 402 | 4/1981 | (EP) . | |
| 0253989 | * 1/1988 | (EP) ................................ | 296/194 |
| 2 246 437 | 5/1975 | (FR) . | |
| 2 576 575 | 8/1986 | (FR) . | |

OTHER PUBLICATIONS

International Search Report dated Jan. 17, 2000.

* cited by examiner

*Primary Examiner*—Stephen T. Gordon
*Assistant Examiner*—Lori L Coletta
(74) *Attorney, Agent, or Firm*—Morgan & Finnegan, LLP

(57) ABSTRACT

The invention concerns a motor vehicle assembly comprising a structural element and a headlamp for the vehicle, wherein the structural element is separate from the motor vehicle body and capable of being directly mounted thereon; the structural element and the headlamp have complementary arrangements for mounting the headlamp on the structural element while allowing the headlamp at least one degree of freedom along a specific direction; the headlamp and the car body have complementary stop arrangements defining a reference position for the headlamp along the specific direction; and elastic means are provided operating between the structural element and the headlamp for urging the headlamp along the specific direction countering the reaction force of the stop arrangements on the headlamp. The invention also concerns a method for mounting such an assembly into the car body, while defining reference position for the headlamp(s).

15 Claims, 2 Drawing Sheets

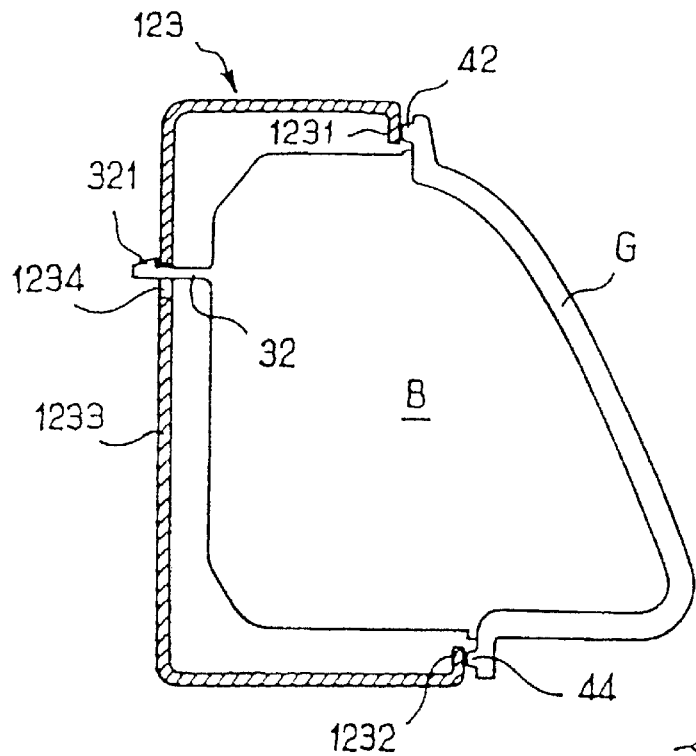
FIG_2
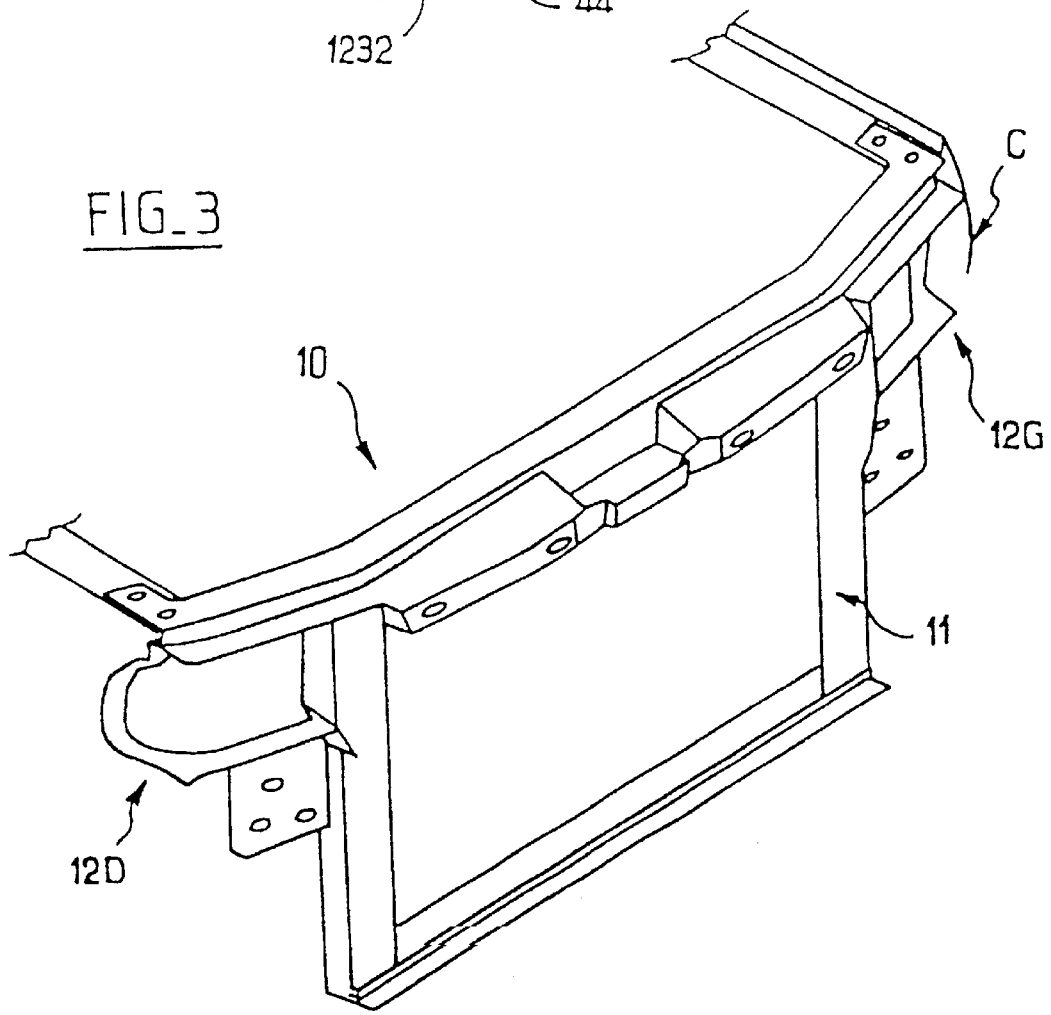
FIG_3

STRUCTURAL ELEMENT WITH AT LEAST A HEADLAMP, AND METHOD FOR MOUNTING SUCH AN ASSEMBLY IN A MOTOR VEHICLE BODY

BACKGROUND OF THE INVENTION

The present invention relates to mounting of headlamps in motor vehicles.

Conventionally, a headlamp is mounted into a vehicle by being fixed by appropriate means onto bodywork parts of the vehicle. These fixing means are generally designed to allow adjustment of the position off the headlamp, in particular so that its glazing occupies the appropriate position, in general flush and essentially in continuity, with respect to the bodywork surrounding the aperture formed therein in order to accommodate the headlamp.

To set up the headlamp correctly in this position, it is known to provide abutment means between the casing of the headlamp and ad hoc arrangements of the bodywork, defining a reference position, and elastic means for forcing the headlamp into this reference position.

This setting-up principle, effective when the headlamp is mounted directly in the bodywork, is inapplicable, in contrast, when the headlamp is mounted on a structural element which is for the purpose first of all of accommodating the headlamp, then of being mounted into the bodywork. In effect, even if a suitable referencing of the headlamp is achieved with respect to this structural element, the manufacturing tolerances and mounting play intervening between the structural element and the bodywork are in practice such that the headlamp will only fortuitously occupied the position sought with regard to the part of the bodywork adjacent to the headlamp. It is precisely with respect to this bodywork part, however, that it is sought to position the headlamp correctly.

BRIEF SUMMARY OF THE INVENTION

The present invention aims to remedy these limitations of the state of the art. It envisages, more precisely, making it possible to take advantage of a prior mounting of the headlamp onto a structural element separate from the bodywork and then affixed onto it, while providing correct positioning of the headlamp with respect to the bodywork adjacent to it.

Hence the invention, according to a first aspect, proposes an assembly of a vehicle structural element and of a headlamp of the vehicle, wherein the structural element is separate from the bodywork of the vehicle and able to be affixed onto it, the structural element and the headlamp possess matching arrangements for mounting the headlamp onto the structural element while leaving the headlamp at least one degree of freedom along a given direction;

the headlamp and the bodywork possess matching abutment arrangements defining a reference position of the headlamp along said given direction, and an elastic means is provided, working between the structural element and the headlamp so as to push the headlamp along said given direction counter to the reaction force from the abutment arrangements on the headlamp.

Preferred, but not limiting, aspects of the assembly according to the invention are as follows:

said given direction is a direction which is generally horizontal and transverse to the axis of the vehicle, the matching abutment arrangements comprise an arrangement formed on a wing part of the bodywork adjacent to an outer edge of a glazing of the headlamp, the matching mounting arrangements comprise hooking lugs formed on the headlamp and interacting with hooking orifices formed in corresponding regions of the structural element, second matching abutment arrangements are also provided, defining a reference position of the headlamp along a second given direction and able to come into action when the matching mounting arrangements are put into use, the elastic means consists of a leaf spring mounted on the structural element.

the elastic means consists of a leaf spring made of the same material as the structural element, the structural element constitutes a vehicle front-face support and accommodates a pair of left-hand and right-hand headlamps.

According to a second aspect, the invention proposes a method of mounting an assembly comprising a vehicle structural element forming a front-face support and a pair of headlamps, the method comprising the following steps:

mounting of the headlamps onto the structural element, leaving the headlamps at least one degree of freedom along a given respective direction, each headlamp then being subjected to the action of a respective elastic means forcing it in said given respective direction, mounting of the assembly thus obtained into the bodywork of the vehicle, the bodywork, in the course of this mounting, pushing the headlamps counter to the forces exerted by the respective elastic means so as to bring the headlamps into given reference positions.

Preferred, but not limiting, aspects of the above method are as follows:

said given respective directions are the same direction generally horizontal and transverse to the axis of the vehicle, the forcing of the headlamps in the course of the stage of mounting the assembly is achieved by ar- rangements formed on wing parts of the bodywork in a way respectively adjacent to the outer edges of the glazing of the headlamps, the stage of mounting the headlamps is carried out by translation and hooking along a direction different from each given respective direction, the translation of each headlamp is carried out as far as an abutment position constituting a reference position of the headlamp along said different direction.

BRIEF DESCRIPTION OF THE DRAWINGS

Further aspects, objects and advantages of the present invention will emerge on reading the description of a preferred embodiment thereof, given by way of non-limiting example and by reference to the attached drawings, in which:

FIG. 2 is a diagrammatic vertical sectional view illustrating arrangements for retaining and setting- up between the structural element and the headlamp, and FIG. 3 is a diagrammatic view in perspective of the structural element.

DETAILED DESCRIPTION OF THE INVENTION

Figure 1:
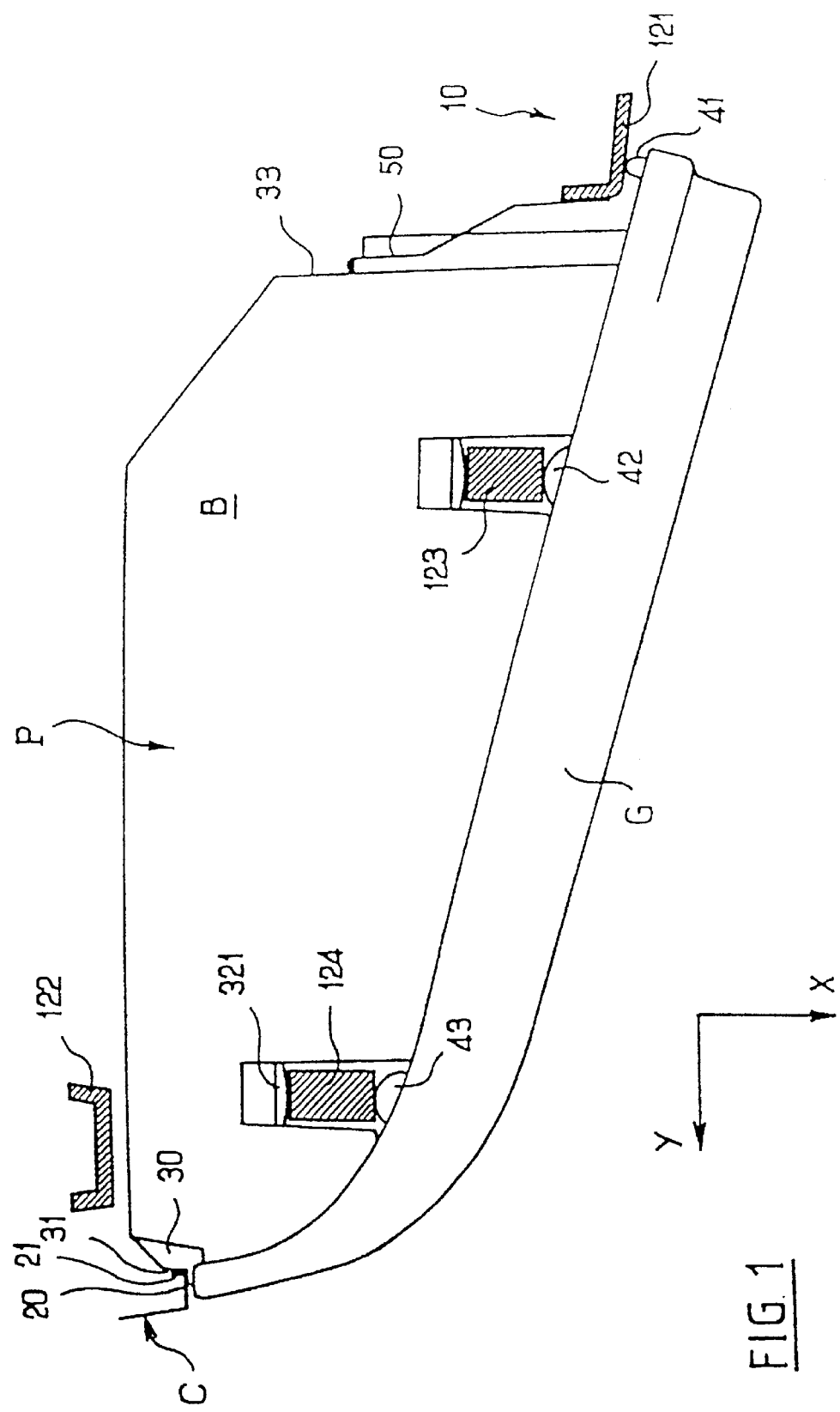
FIG. 1 is a diagrammatic top view of an assembly formed from a part of a structural element of the vehicle and from a front headlamp.

Referring now to the drawings, FIG. 1 represents a headlamp P which conventionally includes a casing B closed by glazing G. This headlamp is intended to be fixed not onto arrangements belonging to the bodywork of the vehicle, but onto a separate structural element 10, called "front-face support", intended to occupy the front region of the vehicle substantially over its entire width. Such a front-face support can be produced from folded metal sheet, from injected plastic, from composite materials, etc.

Such a front-face support 10 is illustrated diagrammatically in FIG. 3 and in essence includes a central frame 11 intended for the fixing of a radiator of the vehicle and of associated equipment, as the case may be (motor-driven fan unit, etc.), and two lateral extensions 12G, 12D, thus forming frames of a sort, intended for mounting two left-hand and right-hand headlamps, which are not illustrated in this figure.

Various parts of the extension 12D intended for the headlamp P are represented diagrammatically in FIG. 1. These arrangements particularly comprise an angle bracket 121 intended to lie beside the headlamp on its inner side, a rear angle bracket 122, and intermediate parts 123, 124 intended, as will be seen in detail later, to provide for the hooking and referencing of the position of the headlamp P.

Also represented in FIG. 1 is the region of the bodywork C adjacent to the outer edge of the glazing G of the headlamp. This bodywork, at this location, possesses a re-entrant rim 20, extending substantially at a right angle with respect to the exterior of the bodywork, this rim 20 being followed by another rim 21 further folded over about 90° in the same direction.

The rim 21 defines an abutment intended to ensure that the headlamp, when it is mounted, occupies a suitable reference position along the transverse axis Y. To that end, the casing B of the headlamp possesses an arrangement such as a member 30 an outer bearing edge 31 of which is intended to bear against the rim or positioning abutment 21.

In order to achieve this referencing, the casing of the headlamp takes up a force towards the outside of the vehicle, that is essentially from the right to the left in FIG. 1. This force is here exerted by a leaf spring 50 which is mounted on the angle bracket 121 of the structural element 10 and which is applied against the side face 33 of the casing B which is situated at the opposite end from the member 30. In the case in which the structural element 10 is produced from a material possessing adequate flexibility, such as a plastic or composite material, the leaf spring 50 may advantageously be made from the same material as this structural element, which makes it possible to dispense with one component.

By virtue of such a configuration, it is possible to mount the headlamp onto a component of the vehicle separate from the bodywork itself, while providing suitable referencing of the position of the headlamp along Y with respect to the bodywork in the region of the adjacent wing.

By reference now to FIGS. 2 and 3, a description will be given of the means which make it possible, on the one hand, to hook the headlamp P onto the front-face support 10, and, on the other hand, the associated means which makes it possible to provide for suitable referencing of the position of the headlamp P along the longitudinal direction of the vehicle (X axis).

These means comprise, on the one hand, a series of hooking lugs such as 32 projecting rearwards from the casing B, each lug 32 possessing, at its free end, a step feature defined by a hooking tooth 321. Each lug can be engaged in an associated aperture 1234 formed in an area 1233 of the intermediate part 123 (or 124), in order thus to retain the headlamp in terms of a displacement frontward on the vehicle along the X direction.

Bosses such as 41, 42, 43, 44 are moreover formed either on the casing B, or on the foot of the glazing G, projecting rearwards, and are able to bear along the X direction against arrangements such as 1231, 1232 formed in the intermediate part 123 (124 respectively).

By dimensioning these members appropriately, it is thus possible for the headlamp to be retained along X with no play.

It will be observed here that the apertures such as 1234 for the hooking lugs 32, as well as the bearing areas such as 1231, 1232 for the bosses formed on the casing or the glazing, are shaped and dimensioned in such a way as to allow the displacement of the headlamp along the Y direction for setting-up with the aid of or elastic piston means (the leaf spring 50) when the assembly consisting of the front-face support 10 and of the headlamps, and of the other members carried by the front-face support as appropriate, is mounted onto the vehicle.

In this context assembly preferably takes place:
- by first of all mounting the headlamps P onto the front-face support 10, by involving the hooking lugs 32 (the headlamps are then set up in the X direction);
- then by mounting this assembly into the vehicle, by the front or by the rear, aligning the sides of the headlamps beside the region of the bearing edges 31 on the adjacent positioning abutments 21; this mounting pushes the headlamps counter to the forces exerted by the associated springs, in such a way as to set up the headlamps correctly along the Y direction;
- then, if necessary, by reinforcing the fixing of the headlamps in the position thus obtained by the use of any appropriate adjustable fixing device.

If appropriate, the leaf spring 50 positioning and abutments 21 and bearing edges, 31 can also be made use of in order to provide referencing of the headlamp along the vertical direction (Z axis).

Needless to say, the present invention is not in any way limited to the embodiment described and represented, but the person skilled in the art will be able to apply any variant or modification in accordance with its spirit.

What is claimed is:

1. An assembly of a vehicle structural element and a headlamp of the vehicle, wherein:
    the structural element is separate from a bodywork of the vehicle and able to be affixed onto the bodywork,
    the structural element and the headlamp possess matching arrangements for mounting the headlamp onto the structural element while leaving the headlamp at least one degree of freedom along a given direction;
    the headlamp and the bodywork possess matching abutment arrangements defining a reference position of the headlamp along said given direction, and
    an elastic means is provided, working between the structural element and the headlamp so as to push the headlamp along said given direction counter to a reaction force from the abutment arrangements on the headlamp.

2. An assembly according to claim 1, wherein said given direction is a direction which is generally horizontal and transverse to the axis of the vehicle.

3. An assembly according to claim 2, wherein the matching abutment arrangements comprise an arrangement formed on a region of the bodywork adjacent to an outer edge of a glazing of the headlamp.

4. An assembly according to claim 1, wherein the matching mounting arrangements comprise hooking lugs formed on the headlamp and interacting with hooking orifices formed in corresponding regions of the structural element.

5. An assembly according to claim 4, further comprising second matching abutment arrangements provided defining a reference position of the headlamp along a second given direction and able to come into action when the matching mounting arrangements are put into use.

6. An assembly according to claim 1, wherein the elastic means consists of a leaf spring mounted on the structural element.

7. An assembly according to claim 1, wherein the elastic means consists of a leaf spring made of the same material as the structural element.

8. An assembly according to claim 1, wherein the structural element constitutes a vehicle front-face support and accommodates a pair of left-hand and right-hand headlamps.

9. A method of mounting an assembly having a vehicle structural element forming a front-face support and a pair of headlamps, the method comprising:
   mounting the headlamps onto the structural element, leaving the headlamps at least one degree of freedom along a given respective direction;
   subjecting each headlamp to an action of a respective elastic means forcing it in said given respective direction; and
   mounting the assembly thus obtained into the bodywork of the vehicle, the bodywork, in the course of this mounting, pushing the headlamps counter to the action exerted by the respective elastic means so as to bring each of the headlamps into a given reference position;
   wherein the given respective directions are the same direction generally horizontal and transverse to the axis of the vehicle and wherein the forcing of the headlamps in the course of the stage of mounting the assembly is achieved by arrangements formed on regions of the bodywork in a way respectively adjacent to the outer edges of the glazing of the headlamps.

10. An assembly comprising:
   a bodywork of a vehicle having a bodywork abutment;
   a front face support having at least one frame;
   a vehicle headlamp having a vehicle abutment, the headlamp being disposed in the frame and adapted to move along at least a direction; and
   wherein the headlamp is fixed by a spring relative to the bodywork and the front face support, without being fixedly mounted to the bodywork, the spring configured to apply force along the direction against the headlamp disposed in the frame of the front face support to cause the bodywork abutment to frictionally engage the headlamp abutment at a reference point along the direction, and wherein the bodywork abutment comprises a shoulder formed from a reentrant rim extending substantially at a right angle with respect to the bodywork and a parallel rim extending substantially parallel to the bodywork and substantially at right angles to the reentrant rim, and wherein the headlamp abutment comprising a complementarily shaped member having a bearing edge configured to bear against the parallel rim.

11. The assembly of claim 10, wherein the reference point is a point on the parallel rim and the direction is along a horizontal axis that is transverse to a vehicle axis defined by the headlamp.

12. An assembly comprising:
   a bodywork of a vehicle having a bodywork abutment;
   a front face support having at least one frame;
   a vehicle headlamp having a vehicle abutment, the headlamp being disposed in the frame and adapted to move along at least a direction; and
   wherein the headlamp is fixed by a spring relative to the bodywork and the front face support, without being fixedly mounted to the bodywork, the spring configured to apply force along the direction against the headlamp disposed in the frame of the front face support to cause the bodywork abutment to frictionally engage the headlamp abutment at a reference point along the direction, and wherein the front face support comprises at least one intermediate part having an aperture, and wherein the headlamp comprises at least one lug having hooking tooth adapted, when the headlamp is disposed in the frame, to extend into the aperture and to prevent movement of the headlamp along a vehicle axis defined by the headlamp.

13. The assembly of claim 12, wherein the intermediate part comprises a c-shaped member having a middle section including the aperture and a pair of end sections, the intermediate part further comprising a pair of flanges extending from the end sections toward one another, and wherein the headlamp includes a glazing, the glazing including a pair of intermediate bosses configured to engage the flanges of the intermediate part and to further prevent movement of the headlamp along the vehicle axis.

14. The assembly of claim 13, wherein the frame comprises a lateral extension having an angle bracket configured to bear against an inner side of the headlamp and a rear angle bracket configured to bear against a back side of the headlamp adjacent to the reference point, and wherein the headlamp further comprises an end boss configured to engage the angle bracket to further prevent movement of the headlamp along the vehicle axis.

15. The assembly of claim 14, wherein the spring is mounted on the angle bracket and is disposed to bear against a side face of the headlamp in a generally transverse direction transverse to the vehicle axis to cause the headlamp abutment to frictionally engage the bodywork abutment at the reference point.

* * * * *